Patented Sept. 18, 1945

2,385,284

UNITED STATES PATENT OFFICE 2,385,284

INSECTICIDES AND METHODS OF USING

William A. Knapp, New York, N. Y., assignor to General Chemical Company, New York, N. Y., a corporation of New York No Drawing. Application January 24, 1942, Serial No. 428,085

7 Claims. (Cl. 167—33)

This invention relates to insecticides. It is particularly directed to a new class of insecticidal compounds for combatting insects, especially insects susceptible to control by stomach poison insecticides, notably the chewing insects, such as the larvae of moths and butterflies, larval and adult beetles, grasshoppers and crickets; insects which feed on exposed liquids and solids such as the house fly and fruit flies; and insects, such as thrips, which lacerate the epidermis of plants and suck up the exuding sap.

In accordance with the present invention it has been found that phenoxazines having the general formula:

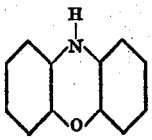

possess insecticidal properties against insects of the above type.

The phenoxazines include the compound phenoxazine and the corresponding compounds in which one or more of the hydrogens thereof has been replaced by an element or radical such as for example a methyl, bromo, or chloro substituent.

The insecticides of the present invention may be applied to the host, e. g., fruit or foliage, or to other food of the insect to be combatted. They are compatible with and therefore may be used in combination with other stomach insecticides, contact insecticides, fungicides, and supplementary materials such as hydrated lime, diluents, sticking, spreading, and wetting agents, etc., commonly used in combination with insecticides. They may be used dispersed in liquids or dispersed in dry form as dusts.

The compounds of the present invention are relatively stable under the usual conditions of use. They possess very low solubility in water and hence are not easily removed from fruit or foliage by rain. The compounds of this invention are believed to be relatively harmless, compared with the arsenates for example, to warm-blooded animals.

The invention will be illustrated by the following example:

Phenoxazine was applied in the form of a solution comprising 1 gram of phenoxazine per 100 cc. of acetone. Each of five apples, the stem and calyx ends of which filled with paraffin before spraying, was sprayed with between 15 and 20 cc. of this solution and allowed to dry. At the same time five apples, the stem and calyx ends of which were filled with paraffin, were sprayed with the acetone free from phenoxazine and also allowed to dry. The calyx ends of the ten apples were then dipped in paraffin to cover the portion of the apples bearing little and no spray and each of the ten apples was then infested with five freshly hatched codling moth larvae. After 10 days, the apples were examined to determine the number of larvae surviving.

The percentage control expressed as the value of $100(X—Y)/X$, where $X$ equals the percentage survival on the check and $Y$ equals the percentage survival on the phenoxazine treated apples, was approximately 93%.

I claim:

1. The method of combatting chewing insects which comprises applying to the food of the insect a phenoxazine.

2. The method of combatting codling moth larvae which comprises applying a phenoxazine to the host.

3. The method of combatting codling moth larvae which comprises applying phenoxazine to the host.

4. A method of combatting insects which comprises subjecting the insects to the action of a composition comprising a phenoxazine.

5. A method of combatting insects which comprises subjecting the insects to the action of a composition comprising phenoxazine.

6. An insecticide comprising a phenoxazine dispersed in a dust carrier.

7. An insecticide comprising the compound phenoxazine dispersed in a dust carrier.

WILLIAM A. KNAPP.